June 23, 1959

J. B. MacNEILL ET AL 2,892,057

AUTOMATIC RECLOSER

Filed May 28, 1956

WITNESSES
Edwin E. Bassler
Leon M. Garman

INVENTORS
John B. MacNeill, Fritz E. Florschutz
& Kenneth L. Niebauer
BY
Francis V. B. Giolma
ATTORNEY

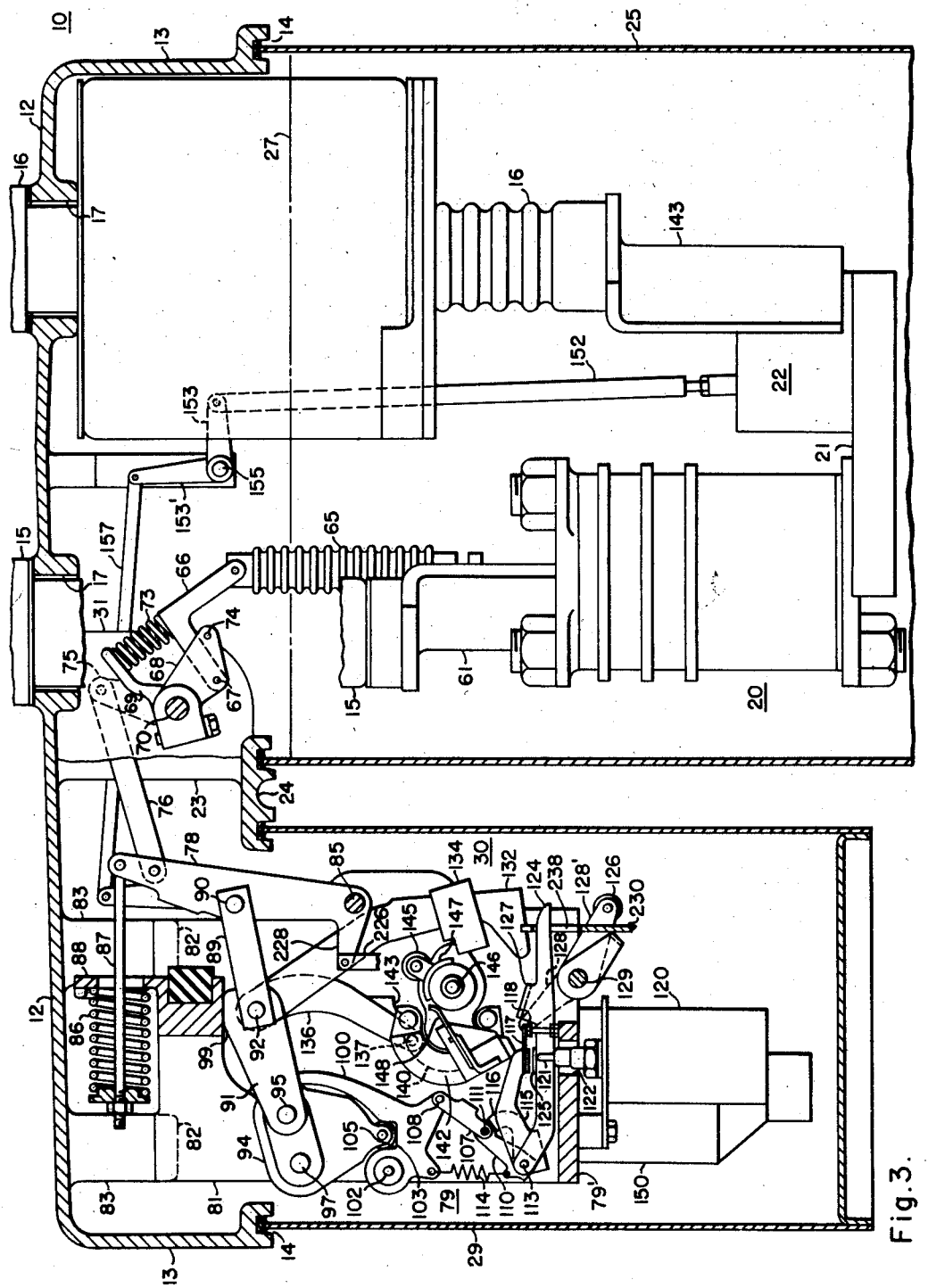

June 23, 1959 J. B. MacNEILL ET AL 2,892,057
AUTOMATIC RECLOSER
Filed May 28, 1956 8 Sheets-Sheet 6

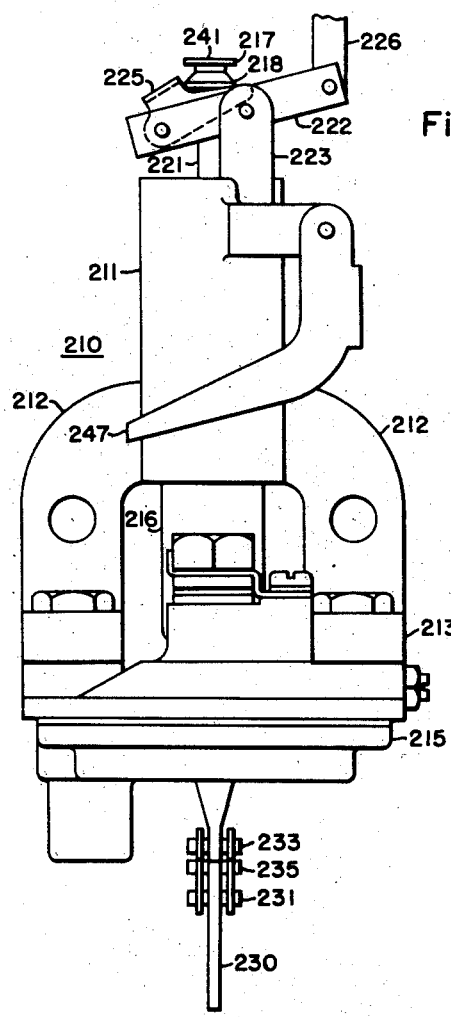
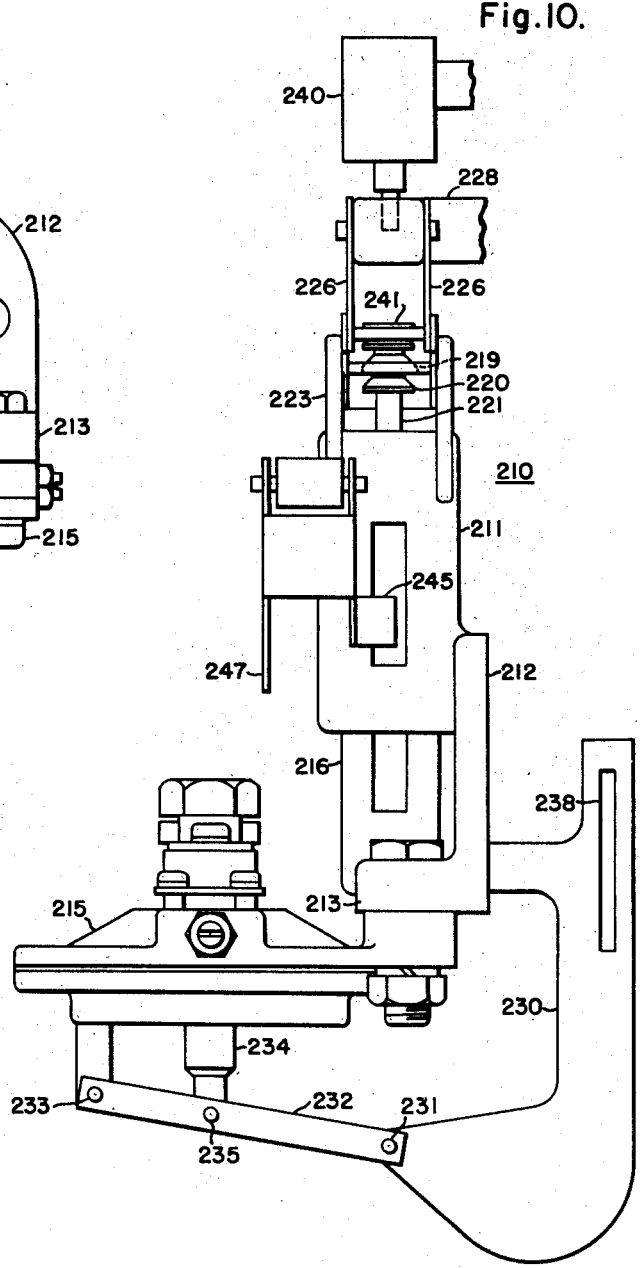

United States Patent Office 2,892,057
Patented June 23, 1959

2,892,057
AUTOMATIC RECLOSER

John B. MacNeill and Fritz E. Florschutz, Pittsburgh, Pa., and Kenneth L. Niebauer, Seattle, Wash., assignors to Westinghouse Electric Corporation, East Pittsburgh, Pa., a corporation of Pennsylvania Application May 28, 1956, Serial No. 587,691

13 Claims. (Cl. 200—97)

Our invention relates generally to circuit interrupters, and has reference in particular to automatic reclosers.

Generally stated, it is an object of our invention to provide an improved polyphase automatic recloser which is simple and inexpensive to manufacture, and is reliable in operation.

More specifically, it is an object of our invention to provide in a three-phase automatic recloser, for having a plurality of circuit interrupters each with separable contacts which are latched closed and are simultaneously opened through the operation of any one of a plurality of time delayed current responsive elements associated with the different interrupters.

It is an object of our invention to provide in an automatic reclosing circuit breaker for utilizing a plurality of pairs of separable contacts which are releasably maintained in a closed position, and for utilizing a plurality of controllable time delay means for releasing said contacts simultaneously.

It is also an object of our invention to provide in an automatic recloser for using a motor-operated mechanism for closing a plurality of separable contacts, and for using a plurality of current responsive elements having delay characteristics controlled by a counter responsive to contact separations, for delaying one or more of such separations in a sequence of closely successive separations.

Yet another object of our invention is to provide in a multi-pole automatic reclosing circuit breaker for using a common release means for releasably holding a plurality of pairs of separable contacts closed, and using a plurality of individually delayed overload responsive means for operating the release means to effect simultaneous separation of said pairs of contacts.

It is also an important object of our invention to provide in a circuit interrupter for a quick opening of separable contacts which are biased open and held closed by releasable means, by utilizing an overcurrent element having a normally ineffective controllable delay characteristic controlled by closely successive separations of the contacts for effecting release of the releasable means.

Another object of our invention is to provide in an automatic recloser, for using a spring-biased operating mechanism for effecting fast opening operation of recloser contacts, and for using series overcurrent trip means located under oil in the recloser tank for releasing the mechanism under the control of air dashpot delay means, located externally of the reclosure tank and operatively connected to the trip means, for delaying one or more separations of the contacts in a series of closely successive separations.

Another important object of our invention is to provide in a reclosing circuit breaker, for supporting a circuit interrupter under oil on one insulating bushing and for supporting a current responsive trip device adjacent thereto under the oil on an adjoining insulating bushing.

A further object of our invention is to provide in a polyphase reclosing circuit breaker, for having a single operating mechanism for simultaneously closing a plurality of pairs of separable contacts, and for having a plurality of individually delayed current responsive means for releasing a common releasable means for opening the contacts.

Still another object of our invention is to provide in a three phase recloser for utilizing counting means with delayed resetting characteristics for locking the contacts in the open position and for actuating the counter not only in response to a predetermined number of closely successive overcurrent conditions, but also when opening the recloser manually or by remote control so as to obtain a single operation to lockout when reclosed after such opening.

Yet another important object of our invention is to provide in an automatic recloser for normally locking the contacts separated after a predetermined number of closely successive contact separations in response to currents above a predetermined value, and for providing additional trip means for opening the contacts and causing them to lock open whenever the breaker is opened by such trip means.

Other objects will in part be obvious, and will in part be explained hereinafter.

In practicing our invention in one of its forms, the contacts of the three pole units of a three-phase automatic recloser are located under oil in a common tank and are operated from a common operating shaft, being opened by means of a spring-operated mechanism located in a separate tank dependent from the same cover as the tank in which the contacts are located. Overcurrent relays are mounted in the same tank with the contacts, and operate a common trip bar positioned in the mechanism tank to release the mechanism for opening the recloser. Air dashpot time delay relays in the mechanism tank are operatively connected to the overcurrent relays to selectively provide delay on predetermined ones of a series of closely successive tripping operations. A motor is mounted in the mechanism tank to operate the mechanism to reclose the contacts following each opening operation, under the control of a time delay switch. A counter-operated switch interrupts the motor circuit after a predetermined number of closely successive operations, and a shunt trip solenoid is provided which both operates a common trip bar to effect separation of the contacts and advances the counter to the lockout position to lock the contacts in the separated position.

For a more complete understanding of the nature and scope of our invention, reference may be made to the following detailed description which may be read in connection with the accompanying drawings, in which:

Figure 1 is a reduced end elevational view of a three-phase automatic recloser embodying the invention in one of its forms;

Figs. 2A and 2B taken together are a partly sectioned plan view of the recloser shown in Fig. 1;

Fig. 3 is a sectional view taken along the line III—III of Fig. 2B;

Fig. 10 is an enlarged front elevational view of the counter shown in Fig. 2B;

Fig. 11 is an enlarged side elevational view of the counter of Fig. 10;

Figures 1, 5:
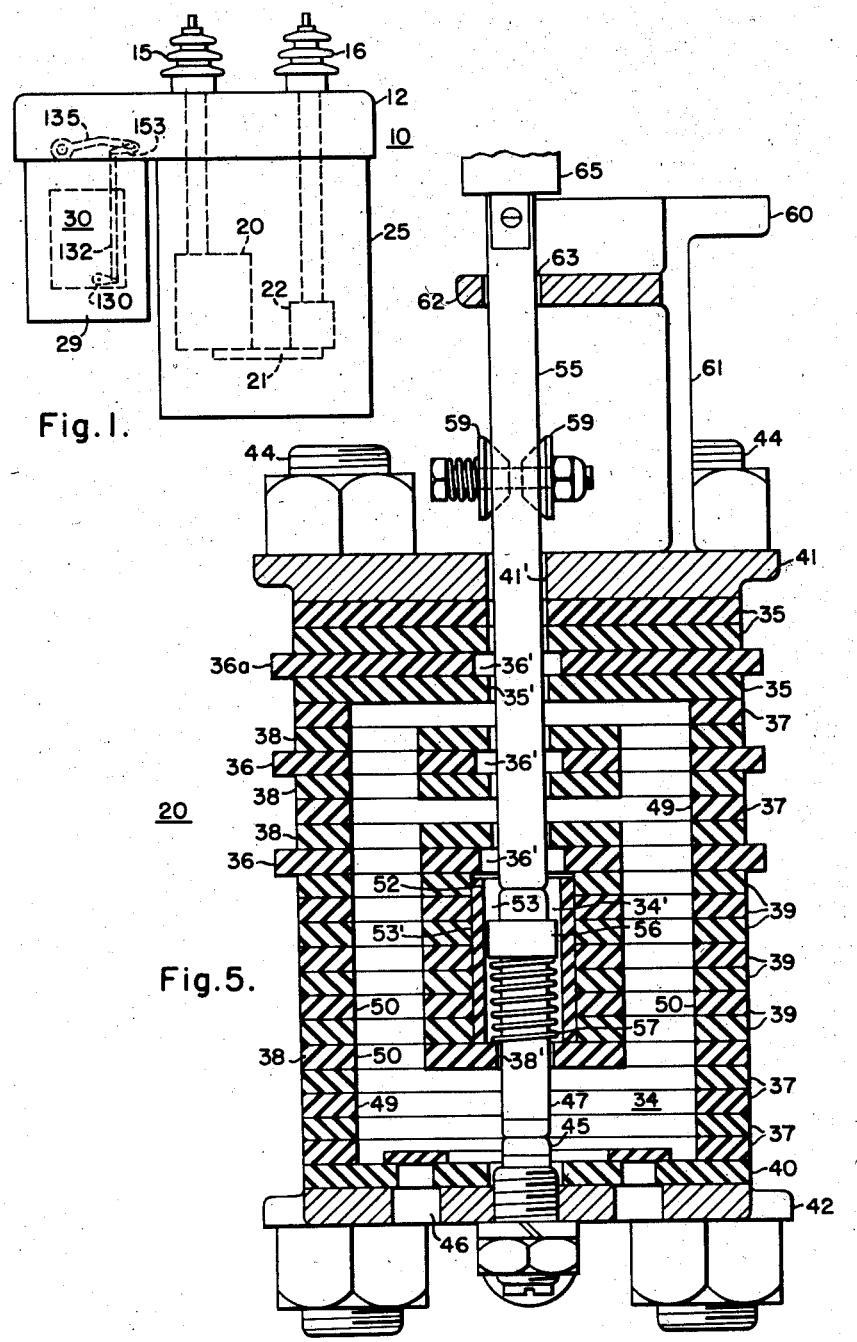
Fig. 5 is an enlarged cross-sectional view of the interrupter shown in Figs. 3 and 4.

Referring to Figs. 1 through 4, it will be seen that the polyphase recloser designated generally by the numeral 10 comprises a substantially rectangular cover casting 12 having depending side portions 13 about the edges thereof with a flange 14 at the lower edge. The cover 12 is provided adjacent one edge with pairs of insulating bushings 15 and 16 for each of the three poles thereof, each pair being arranged transversely of the longitudinal axis of the cover, the pairs being spaced from each other in the longitudinal direction to provide insulated entrances for conductors 18 and 19 of each phase through openings 17 in the casting. Each of the bushings 15 supports at its lower end an interrupter 20 which is connected by means of a conductor 21 to a series type overcurrent trip element 22 supported at the lower end of the associated insulating bushing 16. The cover casting 12 is provided with a depending longitudinal intermediate rib 23 having a flange 24 along its lower edge cooperative with the flange 14 so as to provide for securing an interrupter tank or casing 25 to the flanges 14 and 24 about the interrupters and overcurrent trip means, so that the interrupters and trip means may be positioned in insulating oil having a level designated by the dot-dash line 27. A partition 26' is provided between the intermediate rib 23 and the side 13 adjacent one end to provide a hooded extension 28 and a flange 29 to permit a separate tank 29' to be secured to the casting 12 adjacent the tank 25 for enclosing an operating mechanism 30 shown in Figs. 2B and 3 and time delay means 32 shown in Figs. 2A and 4. The wall 23 is provided with longitudinally spaced apart offsets or pockets 26, 28, 31 and 33 to provide for making mechanical connections in the operating mechanism between the tanks 25 and 29.

Referring to Fig. 5, it will be seen that each interrupter 20 comprises main and auxiliary chambers 34 and 34' defined by a plurality of discs 35, 36, 36a, 37, 38, 39 and 40 which are stacked between top and bottom support plates 41, 42 of metal being secured by means of bolts 44. Plate 36a comprising two sections separated by a transverse slot 36' is positioned near the top of the stack to provide vents through said slot. Plates 36 are also utilized, being similar to plate 36a, except that they have diametrically opposed openings 50 which function to provide oil passages therethrough. The bottom plate 42 has a stationary contact 45 centrally secured therein for engaging an intermediate movable contact 47, and has vent openings 46. The plates 35 have a central opening 35'. The plates 37 are provided with a relatively large central opening 49 to furnish a substantially enclosed main arc chamber space 34 adjacent the lower end of the interrupter, while the insulating plates 38 have a corresponding central opening 38' and aligned openings 50 on opposite sides to provide oil passages up through the stacked plates. The plates 39 are each also provided with aligned openings 50, and are further provided with a central opening 52 which is aligned to provide a secondary chamber 34' substantially enclosed at the top and bottom by plates 38 wherein an elongated contact rod 55 which is vertically movable through the central openings 35' and 38' engages the upper end of the intermediate contact member 47. A sleeve 53' lines the chamber 53.

The intermediate contact member is provided with a collar 56 which is guided by sleeve 53' and a spring 57 within the chamber 53, so as to bias the contact member 47 upwardly to follow the contact member 55 whenever it is raised for a predetermined distance. Rollers 59 are mounted on the upper support plate 41 adjacent opening 41' for providing adequate contact with the contact rod. The interrupter 20 is mounted on the insulating bushing 15 by means of a flange 60 projecting laterally from an upstanding support 61 on the upper plate 41. A laterally extending rib 62 on the support 61 is provided with an opening 63 for guiding the contact rod 55.

Figure 2A:
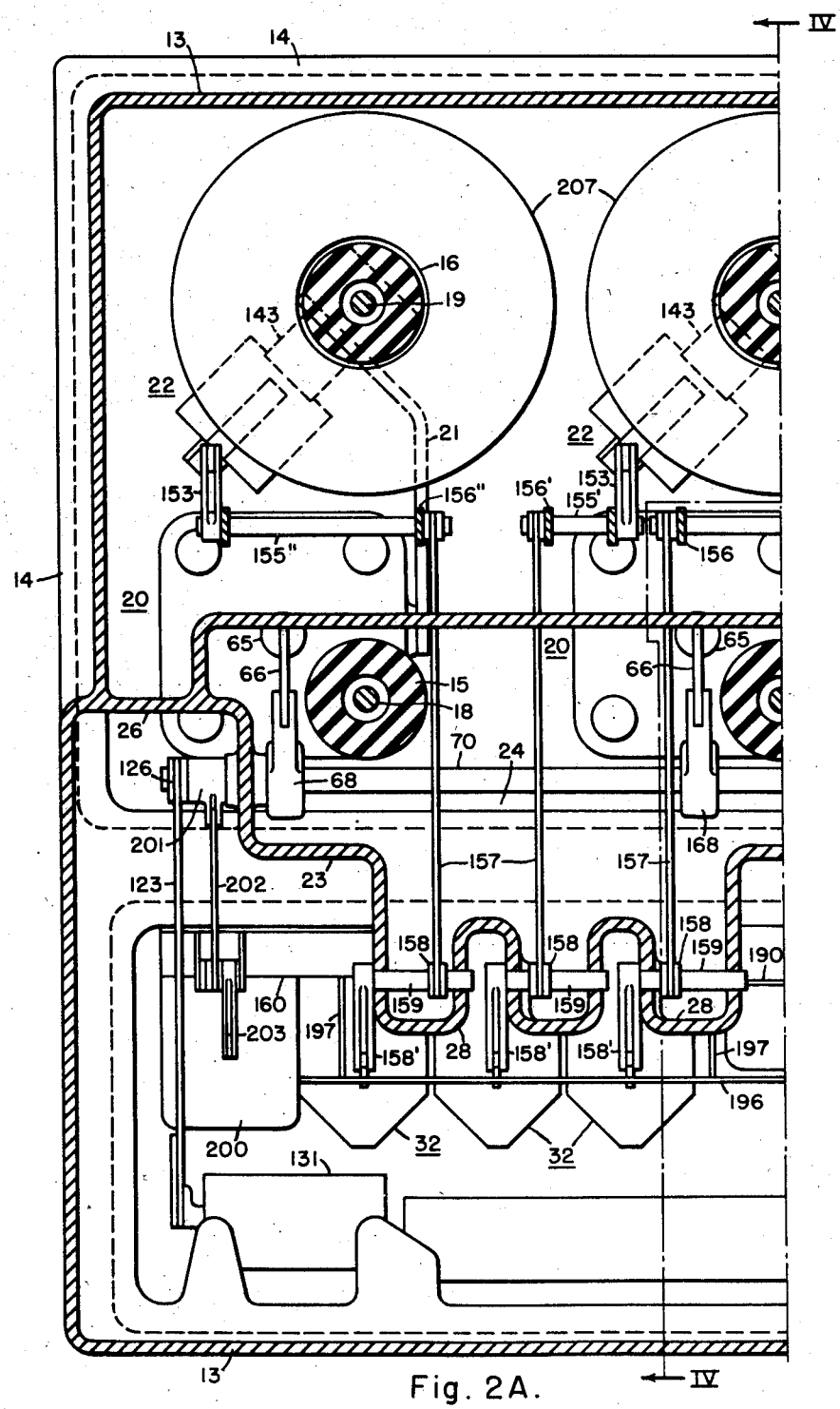
Figure 2B:
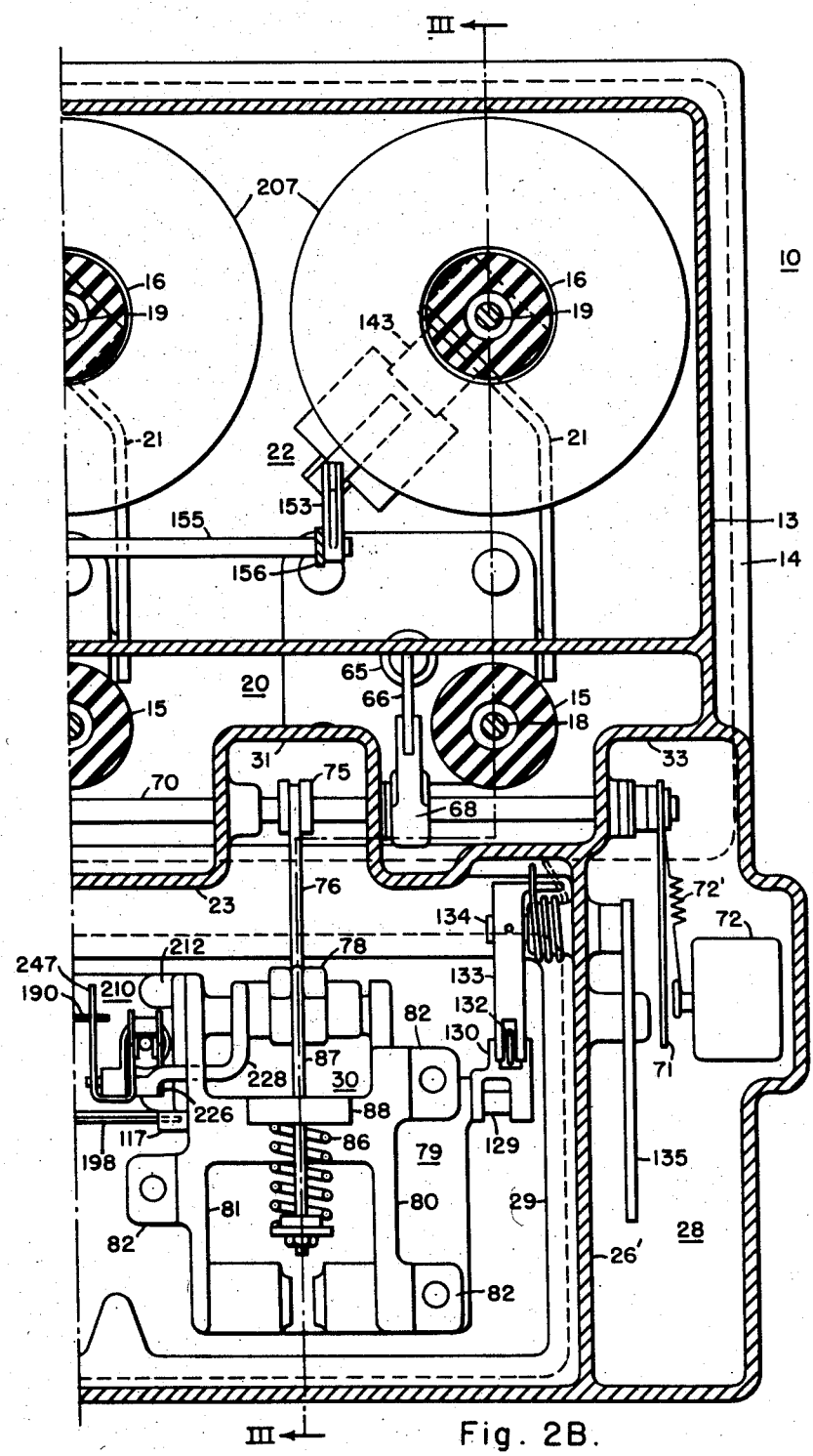

Referring to Figs. 2A, 2B and 3, it will be seen that the contact rod 55 is connected by means of an insulating link 65 to an L-shaped lever 66 which is pivotably mounted by means of a pivot 67 to a lever 68 secured to a shaft 70 rotatably mounted in suitable bearings positioned in the sidewalls of the pockets 26, 31 and 33 of web 23 of the cover casting. A spring 73 disposed between the lever 66 and an arm 69 of lever 68 normally biases the lever 66 to engage a stop 74 on the lever 68 so as to provide a predetermined amount of spring pressure on the contacts. The shaft 70 is provided with a lever 75 which is positioned in pocket 31, and connected by means of a link 76 to an operating lever 78 of the operating mechanism 30. An indicator 71 is mounted on the shaft 70 and an operation counter 72 is connected thereto by a spring 72.

The operating mechanism 30 is mounted in a frame 79 which, as shown in Figs. 2B and 3, is substantially U-shaped, having a base 79' with upstanding sides 80 and 81 which are spaced apart and are secured by means of flanges 82 to bosses 83 depending from the cover casting 12. The operating lever 78 is pivotally mounted on a shaft 85 mounted in frame 79, and is biased in a counterclockwise direction by means of a spring 86 and rod 87 mounted in connection with an upwardly projecting lug 88 extending between the sidewalls 80 and 81 of the mechanism frame. The lever 78 is releasably held in the closed position shown with the spring 86 compressed, by means of a toggle linkage comprising a link 89 connected to lever 78 by a pivot 90, a toggle link 91 pivotally connected to the link 89 by a common pivot 92, and a latch lever 94, which is connected to the toggle link 91 by a pivot 95 and is rotatably mounted on a shaft 97 supported in the frame 79.

The toggle linkage in the position shown has the toggle link 91 resting against a stop 99, with the pivots 92 and 95 in overcenter positions. The pivot 95 is maintained in this position by means of a latch 100 which is pivotally mounted in the frame 79 on a shaft 102, and has a recess 103 which receives a roller 105 on a lower portion of a latch lever 94. The latch 100 is maintained in the position shown, by a toggle linkage comprising a link 107 pivotally connected to the latch at 108, and a link 110 connected to link 107 by a pivot 111 and rotatably supported in the frame 79 on a fixed pivot 113. A spring 114 connects link 110 and latch 100. A trip lever 115 is rotatably mounted on the pivot 113 having a projection 116 for actuating the common pivot 111 overcenter and a laterally projecting pad 117 for operating the lever. An adjustable stop 118 normally engages pad 117 and holds the trip lever 115 in a position with the toggle levers 107 and 110 slightly overcenter.

When trip lever 115 is rotated counterclockwise projection 116 breaks the toggle arrangement of links 107 and 110, permitting latch 100 to rotate clockwise and release roller 105. Lever 94 rotates counterclockwise and pivot 95 moves further overcenter, causing pivot 92 to drop undercenter and permit spring 86 to rotate operating lever 78 counterclockwise and causing links 107 and 110 to reset to the positions shown.

A shunt trip solenoid 120 is secured to the bottom of the mechanism frame 79, having an armature with a projection 121 which passes through an opening 122 in the bottom of the frame. An auxiliary trip lever 124 is pivotally mounted on the same pivot 113 as lever 115, and is provided with a laterally extending tab 125 disposed to be engaged by the projecting trip member 121 of the shunt trip solenoid, and also actuate the trip lever 115. The auxiliary trip lever has an additional lateral projection or flange 127 disposed to be engaged by a manual trip lever 128, which is rotatably mounted on a shaft 129 for engagement by a lever 128' for effecting manual tripping. As shown in Fig. 2B, the shaft 129 is rotatably mounted in the mechanism frame 79 and has secured thereto adjacent one end a lever 130 which is operatively connected by means of a link 132 to a lever 133 secured to a shaft 134 projecting through the end wall of the cover casting where there is secured thereto a handle 135 which is positioned beneath the hooded portion 28 of the casting where it is accessible from the outside for operation by means of a hook stick or the like. As shown in Figs. 2A and 2B, the shaft 70 is common to the interrupters of each phase so that operation thereof controls the contact rod for each phase simultaneously. An auxiliary switch 131 is mounted under the cover 12 and operated from the shaft 70 by means of a lever 126 mounted on shaft 70, and a connecting link 123.

Manual closing of the recloser is effected by pushing the handle 135 upwardly or in a clockwise direction so as to rotate the shaft 129 counterclockwise and thus cause roller 126 carried by lever 128' to engage the lower end of a closing link 132, which is pivotally connected to the toggle links 91 and 89 at pivot 92. The closing link 132 is slidably disposed in a guide collar 134 to maintain it in alignment for substantially vertical movement by the roller 126. This raises the pivot link 92 to substantially the position shown and forces the closing lever 78 to rotate in a clockwise direction, thus compressing spring 86 and moving the contact rod 55 downwardly and reclosing the breaker contacts.

The breaker may also be reclosed automatically by means of a closing link 136 also connected to the common pivot 92 and has a pin 137 at its lower end which is free to move in an arcuate slot 140 in a guide member 142. The closing link 136 is provided with a shoulder 143 disposed to be engaged by a roller 145 carried by a shaft 146 rotatably mounted on the sidewall 81 of the mechanism frame. A drum switch comprising a contact segment 147 mounted on shaft 146, and a stationary contact member 148 is utilized as a limit switch in controlling the operation of a motor 150, which is mounted on the bottom of the mechanism frame and connected by means of a worm gear drive (not shown) for rotating the shaft 146 to effect reclosing.

Figure 6:
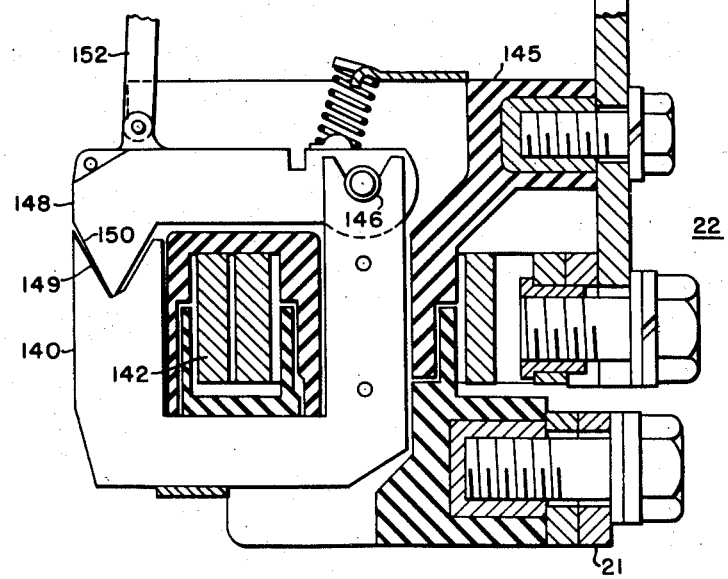
Fig. 6 is an enlarged view, partly in section, of the overcurrent trip relay shown in Figs. 3 and 4.

Referring to Fig. 6, it will be seen that the overcurrent trip element 22 of each pole comprises a substantially U-shaped magnetic core 140 provided with an operating coil 142 which is connected as shown in Figs. 2A and 2B in series with the conductor 19 and the stationary contact 45 of the interrupter 20 by means of a support conductor 143 and the connecting conductor 21. The core 140 is secured to the support conductor 143 as by a molded body of insulation 145, and has pivotally mounted thereon as by pivot 146 an armature 148, which is normally positioned to provide an air gap between the pole faces 149 and 150 of the core and armature. The armature 148 is connected as shown in Fig. 3 by means of an operating rod 152 to bell crank levers 153, 153' which are pivotally mounted as by means of a shaft 155 supported from the cover casting 12 by means of a bracket 156. The other pole units are provided with individual shafts 155' and 155" supported by brackets 156' and 156" so that operation of their overcurrent relays 22 are individual to the particular pole units. The bell crank levers 153' connect by means of links 157 to levers 158 located in recesses 28 of the rib 23 and rotatably mounted by means of individual shafts 159 having associated levers 158' in the walls of said recesses projecting into the mechanism tank portion of the cover casting.

Figures 7, 8:
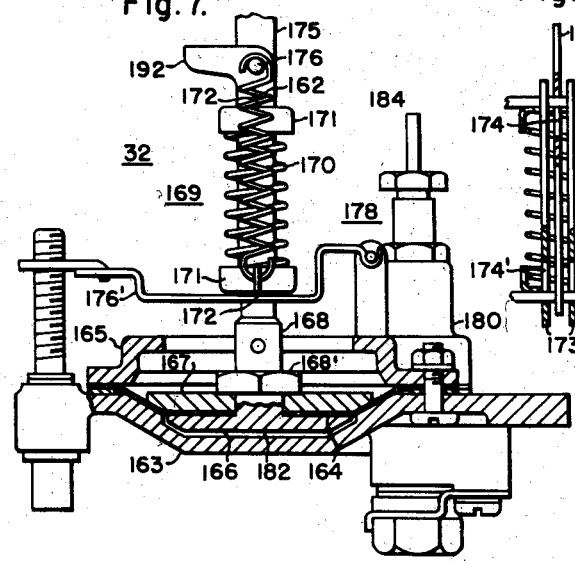
Fig. 7 is an enlarged elevational view partly in section of the time delay means of Fig. 4.
Fig. 8 is an enlarged partial view of the resilient connection of the time delay means.

A control panel 160 is mounted in the mechanism tank 29, being secured to the cover 12 by means such as a boss 161 dependent from a portion of the central web 23. On this panel are mounted the plurality of time delay means 32 individual to each of the interrupters 20 for controlling the opening thereof. As shown in Fig. 7, each of the time delay means 32 may comprise a diaphragm type dashpot having a dished main casing member 163 with a diaphragm 164 clamped thereto by means of a ring 165. The diaphragm is clamped between plates 166, 167 by means of a nut 168' secured to a central boss 168 on the plate 166. A resilient lost motion connecting device 169 including a spring 170 contained between upper and lower caps 171 by means of pins 172 and 172' secured to extensions 173 of boss 168 and to the lower end of rod 175, respectively, and sliding in slots 174 and 174' in a rod 175 and extension 173 (as shown in Fig. 8) provides a resilient connection between the operating rod 175, which is connected to the bell crank lever 158' by a pivot 177, and to the central boss 168. This provides for immediate operation of the overcurrent trip relays 22 in the event of an excessive fault of for example, about ten times normal current, thus modifying the normal inverse time-current characteristic thereof. Springs 162 are connected between a pin 176 on rod 175 and an adjustable tension lever 176' to adjust the current pickup value of the delay means.

Figure 9:
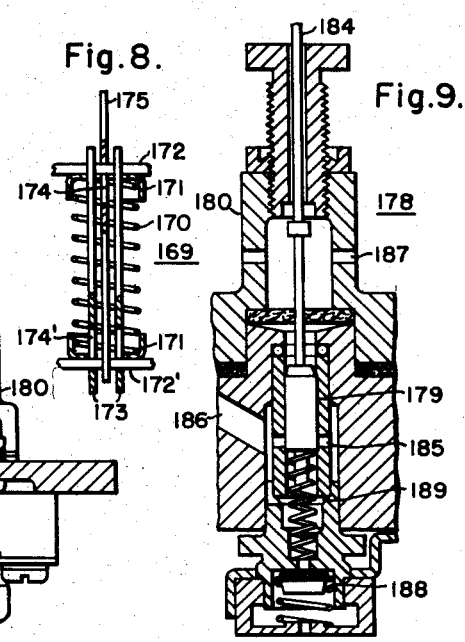
Fig. 9 is an enlarged cross-sectional view through the valve of the time delay relay shown in Fig. 7.

A control valve 178 shown in Fig. 9, and which includes a slidable valve member 179 mounted in a bushing 180 on the lower casing member 163, provides for venting the space 182 between the diaphragm 164 and casing 163 to render the time delay ineffective and permit rapid upward movement of the central boss 168. Air is drawn in through the clearance fit about the valve member 179 in the delay position as shown. As shown in Fig. 9, the valve member 179 is spring biased to the position shown, and is operated downwardly by an extension 184 to clear a transverse passage 185 which permits air to enter a passage 186 leading through the casing to the space 182 from an air vent 187 in the bushing 180. A check valve 188 at the lower end of the valve chamber 189 permits air to be rapidly exhausted from the space 182 and permit a fast return of the diaphragm to the position shown.

Figure 4:
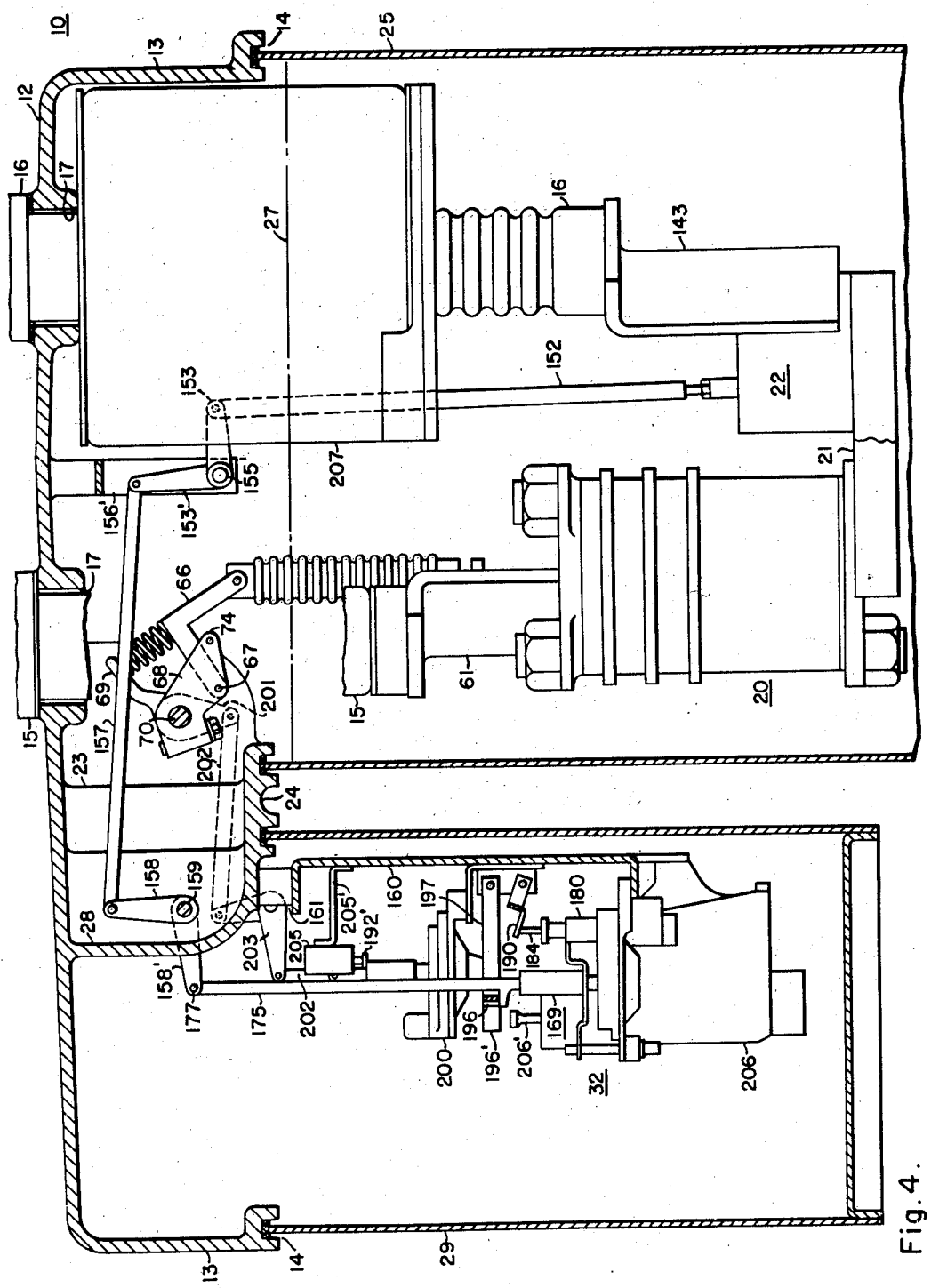
Fig. 4 is a sectional view taken along line IV—IV of Fig. 2A.
Figure 12:
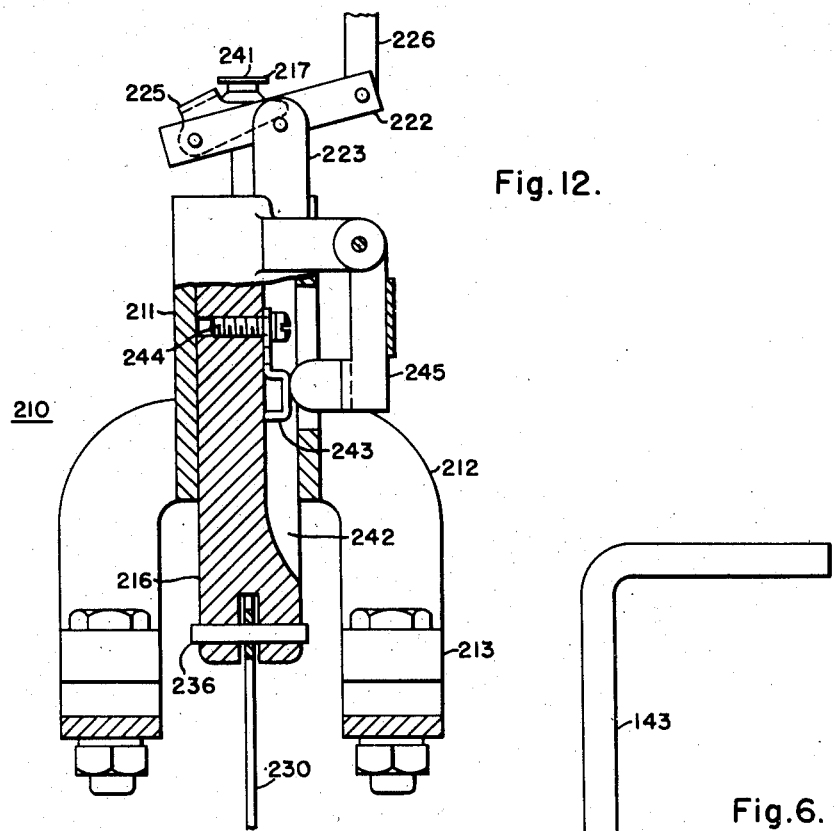
Fig. 12 is an enlarged side elevational view partly in section of the counter shown in Figs. 10 and 11.

Operation of the several members 184 is provided by means of a common pivotal valve control member 190, which is pivotally mounted on the panel 160 as shown in Fig. 4, and extends longitudinally thereof as shown in Figs. 2A and 2B. Tripping of the operating mechanism is effected by means of projecting shoulders 192 on the operating members 176 which engage a common trip bar 196 extending longitudinally of the panel as shown in Figs. 2A and 2B. The trip bar 196 is pivotally mounted on the panel by means of arms 197, and extends longitudinally, having a trip extension 198 adjacent the operating mechanism 30 which engages the pad 117 when raised, and actuated the trip lever 115 to open the contacts. Manual tripping is effected by pulling downwardly on handle 135 to rotate shaft 129 clockwise, whereupon lever 128 lifts auxiliary trip lever 124 and trip lever 115.

Also mounted on the panel 160 is an air dashpot time delay device 200 as shown in Figs. 2A and 4, of substantially the same type as the delay devices 32, except that no control valve is provided therewith, the delay movement being provided for operation in the upward direction. This time delay device is operatively connected to the shaft 70 by means of a lever 201, a link 202, and a bell crank lever 203 to effect by means of projecting shoulders 192' delayed operation of a microswitch 205 which is mounted on panel 160 by a bracket 205' and used to set up a reclosing circuit for the closing motor 150.

A ground fault device 206 substantially similar to the overcurrent trip device described in detail in Patent No. 2,691,709 which issued on October 12, 1954 to H. J. Lingal et al., but responsive to a lower value of current is mounted on the panel 160 as shown in Fig. 4, having a solenoid actuated trip member 206' for also operating an extension 196' of the common trip bar 196 to effect separation of the contacts in response to a ground fault.

current. Bushing type current transformers 207 are mounted on the lower ends of the insulating bushings 16 in the interrupter tank 25 for supplying current to the ground fault trip device 206.

In order to provide for locking the recloser open after a predetermined number of closely consecutive openings, an integrator or counter 210 is provided. The integrator comprises a substantially cylindrical body member 211 as shown in Figs. 2B, 10, 11 and 12, having depending mounting arms 212 on one side at the lower end by which it is secured to one side of the outer wall 81 of the mechanism frame as shown in Fig. 2B. The arms 212 are provided with feet 213 for securing thereto an air dashpot delay device 215 which may be of a type similar to the delay device 32 thereto, and which is inverted for delaying downward movement or reset of an advanceable counter member 216 slidably disposed within the cylindrical body 211. The counter member 216 is provided with axially spaced flanges 217, 218, 219 and 220 on an extension 221 at the upper end thereof. A lever 222 pivotally mounted on arms 223 extending from the body carriers a pawl member 225 disposed to engage these flanges in succession when the lever 222 is rotated in a clockwise direction by means of operating links 226 which are connected to a lever 228 projecting laterally from the mechanism operating lever 78. The operative connection of lever 228 and links 226 is shown in Figs. 10 and 2B.

Connected to the lower end of counter member 216 is a link 230 which is pivotally connected at 231 to a lever 232 hinged at 233 to the casing of the dashpot device 215, and connected to the diaphragm boss 234 thereof by pivot 235. This arrangement provides for rapid upward movement of the counter member 216, but delays the downward movement thereof so as to provide for cumulative or progressive advance of the counter member 216 upwardly by pawl 225 in response to a plurality of closely successive operations of the recloser. The link 230 is connected to the counter member 216 by a pin 236 at the lower end thereof and is provided with an elongated slot 238 for receiving the end portion of the auxiliary trip lever 124 as shown in Fig. 3. In the event that the trip lever 124 is moved in a counterclockwise direction by either the shunt trip solenoid 120, or the manual trip lever 128, the link 230 will be raised by the auxiliary trip lever 124 to advance the counter member 216 immediately to the lockout position. In this position a microswitch 240, which is positioned to be engaged by the upper end 241 of the extension 221 after for example, four closely successive opening operations of the recloser, or whether the recloser is tripped either manually or by the shunt trip solenoid 120, interrupts the operating circuit for the closing motor 150 to prevent reclosing, and thus locks the recloser open.

The counter member 216 has a longitudinal groove 242 in one side, in which is adjustably positioned a cam member 243 by means of a screw 244. The cam member 243 engages and positions a cam lever 245 pivotally mounted on the counter body 211 and having a projection 247, which as shown in Fig. 2B actuates the time delay valve control member 190 to vent the delay devices 32 and render them normally ineffective on the first one or two opening operations.

Figure 13:
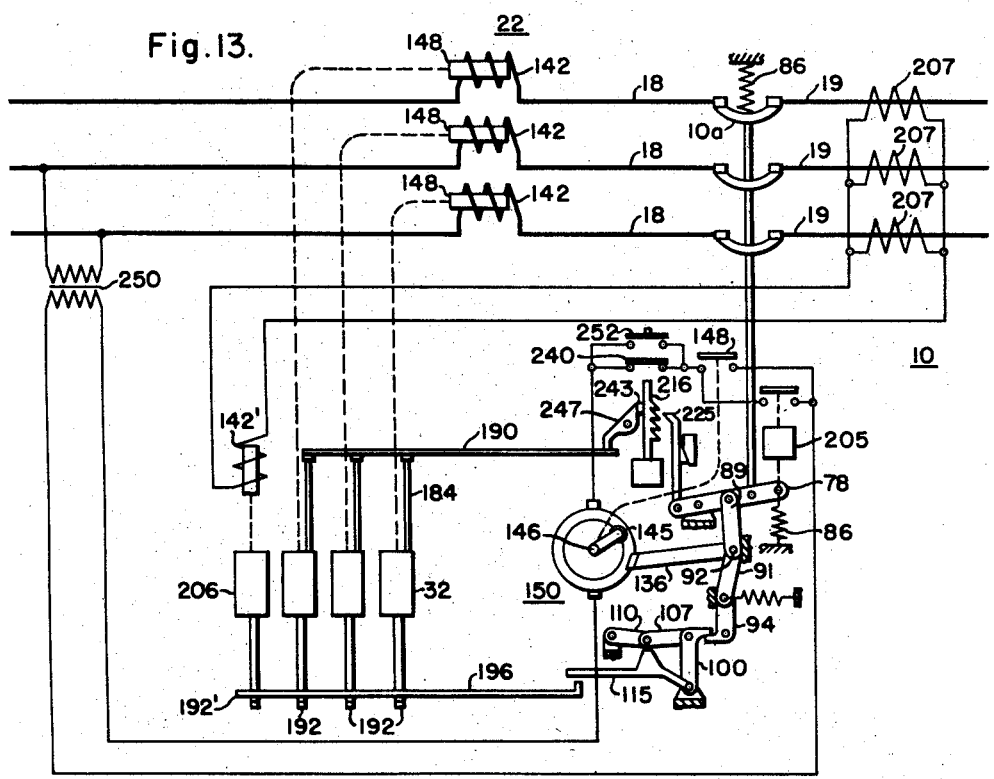
Fig. 13 is a diagrammatic view of the automatic recloser shown in Figs. 1 through 4 showing the circuit connections of the different elements.

Referring to Fig. 13, it will be seen that the recloser 10 is disposed to interrupt the circuit between conductors 18 and 19 of a three-phase circuit, the separable contacts being in this instance represented by the bridging type contact 10a in each instance instead of the single butt type contacts 45 and 47 as hereinbefore described. The trip relays 22 are shown with their trip coils 142 connected in circuit with the conductors 18 for operating armatures 148 which are operatively connected by means of dotted lines to actuate the common trip bar 196 through time delay devices 32, which have valve operating members 184 for venting the delay means to obtain substantially instantaneous action, with the lever 247 actuated by cam 243 to the initial position as shown. Current transformers 207 are connected in parallel circuit relation to the trip coil 142′ of the ground fault trip relay 206 for also operating the trip bar 196.

Operation of the trip bar 196 actuates trip lever 115, which breaks the toggle arrangement of levers 107 and 110 and disengages latch 100, to permit collapse of toggle levers 91 and 94 to the right, and hence permit toggle link pivot 92 to pass under center and provide for pivotal movement of operating lever 78 by opening its spring 86, which is compressed in the closed condition of the recloser. Operation of lever 78 actuates pawl 225 to advance the counter member 216 each time the breaker opens. A predetermined time after the breaker opens, a circuit is provided for the closing motor 150 through the lockout switch 240, which is normally closed, the time delayed reclosing switch 205, which is operated by the mechanism lever 78, and limit switch 147—148, which is actuated by motor 150.

Energization of the closing motor 150 from a source such as a control transformer 250 effects rotation of shaft 146 and causes roller 145 to engage closing link 136 and return the common pivot 92 of toggle links 89 and 91 to the overcenter position shown, thus causing rotation of the closing lever 78 in a direction to close the contacts. Shortly after the operating mechanism begins to move, the reset switch 205 opens and drum limit switch 147—148 closes to maintain the energizing circuit until the recloser is reclosed. After a predetermined number of such operations, the counter member 216 operates the limit switch 240 to interrupt the energizing circuit for the motor 150 and thus provide for locking the counter in the open direction. Reclosing may then be effected either by manual operation of the mechanism or by means of a control switch 252 which parallels and bypasses the lockout switch 240. Since the pawl 225 holds the counter member 216 advanced, when the recloser is locked open, only a single operation is required to again lock the recloser open when it is reclosed following lockout.

From the above description and the accompanying drawings, it will be apparent that we have provided a polyphase automatic recloser which is compact and efficient in operation. Since the contacts are biased open by a spring and held closed by a releasable toggle latch mechanism, tripping of the breaker is reliable and highly accurate, since the only force required is that necessary to release the toggle mechanism. Reclosing is effected by means of a motor which requires only a relatively small current for the torque obtainable. Since the three poles are mechanically interconnected, simultaneous operation thereof is insured. By effecting tripping through a delayed overcurrent relay, actual opening operation of the breaker is unimpeded, and fast separation of the contacts is obtained. By utilizing bushing type current transformers for ground fault tripping, no extra space for high voltage current transformers is required, since the same bushings serve a double purpose. By utilizing delay means of the air dashpot type, consistently accurate timing is obtained over a wide range of temperature conditions. Separate tanks for the interrupters and the mechanism permit the air dashpot time delay devices to be maintained clear of any possibility of oil splashing, and yet both the interrupter and the overcurrent relay are oil immersed, insuring the maximum insulation and arc interruption. Since the counter is operated to the lockout position when the recloser is tripped either manually or by the shunt trip a single operation to lockout results when the recloser is reclosed after lockout for any reason.

Since certain changes may be made in the above described construction and different embodiments of the invention may be made without departing from the spirit and scope thereof, it is intended that all the matter contained in the above description and shown in the accompanying drawings shall be considered as illustrative and not in a limiting sense.

We claim as our invention:

1. A circuit interrupter comprising, a plurality of pairs of separable contacts, a common operating mechanism for all of said contacts, biasing means biasing the mechanism to separate the contacts, means including a toggle linkage having overcenter and undercenter pivots holding the mechanism in a contact closed position when the linkage is extended, means including a motor actuated member for moving one of the pivots overcenter, releasable means normally holding the other of said pivots slightly undercenter so that the linkage is extended, a plurality of electroresponsive means each having a part movable in response to a predetermined value of current to effect release of the releasable means, and time delay means individual to said electroresponsive means delaying predetermined ones of a series of contact separations.

2. In a circuit interrupter, a container, a cover supporting said container and extending beyond said container, a second container depending from said extending portion of the cover, insulating means extending through the cover into the first-mentioned container, a circuit interrupter having relatively movable contacts supported in said first container by said insulating means, a second insulating means extending through the cover into the first-mentioned container in spaced relation with said first-mentioned insulating means, current responsive means supported by said second-mentioned insulating means in spaced relation with said interrupter and having an operating winding connected in circuit with said contacts, an operating mechanism for said contacts including a lever disposed in the second-mentioned container and a spring biasing said lever in a direction to effect separation of the contacts, a motor connected to move said lever in a direction to close said contacts, releasable means holding said lever against the bias of the spring, and means including delay means disposed in said second-mentioned container connected to the current responsive means to effect delayed release of the releasable means.

3. In a circuit interrupter, separable contacts, operating mechanism for said contacts, means biasing the operating mechanism to separate the contacts, electro-responsive means operable to actuate the operating mechanism to close the contacts, releasable means holding the operating mechanism in a closed contact position, current responsive means operable to effect release of the releasable means, delay means delaying release of the releasable means, and means including a counter advanced by closely consecutive separations of the contacts to render the delay means ineffective to delay release of the releasable means for one or more in a series of closely consecutive contact separations.

4. A circuit interrupter comprising, separable contacts, operating mechanism for said contacts, a spring biasing the mechanism to effect rapid separation of said contacts, releasable means holding the mechanism in a contact closed position, means including an electric motor operable to actuate the mechanism to the contact closed position, current responsive means having a movable part, delay means connecting the movable part to effect release of the releasable means, switch means actuated by the mechanism to effect operation of the motor to close the contacts, and means including a counter having a part advanced by closely consecutive separations of the contacts, and switch means in a circuit with the motor actuated by predetermined advancement of said part to interrupt the motor circuit.

5. In a circuit interrupter, separable contacts, operating means for said contacts, means biasing the operating means to effect separation of the contacts, electro-responsive means operable to actuate the operating means to close said contacts, releasable means holding said operating means with the contacts closed, current responsive means having a movable part operable to effect release of the releasable means, normally ineffective delay means operable to delay the current responsive means, and cumulatively advanceable counter means operated by closely successive operations of the operating means to render the delay means effective on a predetermined operation in a sequence of closely successive operations of the contact operating means.

6. A circuit interrupter comprising, separable contacts, operating means for said contacts, biasing means actuating the operating means to effect separation of the contacts, releasable means holding the operating means in a position to hold the contacts closed, current responsive means having a part movable by a current above a predetermined value to effect release of the releasable means, means including a motor driving a rotary cam to operate the operating means to close said contacts and reset the releasable means to a contact closed position, counter means cumulatively advanced by closely successive separations of the contacts, and switch means in circuit with the motor actuated by the counter means.

7. In a circuit interrupter, a common cover having oppositely disposed depending edge walls and a depending intermediate web, an oil-filled container secured to the web and a part of the edge wall, an additional container adjoining the oil-filled container and secured to the web and another part of the edge wall, separable contacts supported from the cover in the oil-filled container, an operating mechanism for said contacts in said oil-filled container, operating means for said mechanism in said additional container including a lever biased to separate said contacts and releasable means for holding the lever in a contact closed position, means connecting the operating means and the operating mechanism including a common oscillatable shaft, overcurrent-actuated means supported in the oil-filled container, a trip mechanism connecting the current-actuated means to effect release of the releasable means in the additional container including delay means in the additional container delaying release of the releasable means, and reclosing means in said additional container including a motor and a switch operated in response to separation of the contacts for actuating the operating lever to close said contacts.

8. In a circuit interrupter, a substantially closed arc chamber, a fixed contact in said chamber, a movable contact rod entering said chamber, an intermediate contact between the stationary contact and contact rod, means biasing the intermediate contact away from the stationary contact, operating means including a spring biasing the contact rod away from the intermediate contact, releasable means holding the operating means against the bias of said spring, current responsive means having a part movable to effect release of the releasable means, delay means delaying release of the releasable means by said part, and electroresponsive means operable when the contacts separate to return the operating means to a contact closed portion and compress said spring.

9. In a circuit interrupter, separable contacts, an operating mechanism therefor, means biasing the mechanism to open contacts, closing means operable to actuate the mechanism to close the contacts, releasable means holding the contacts closed, means actuated by a current above a predetermined value to effect release of said releasable means, switch means connected in circuit with said closing means to provide a closing circuit therefor upon separation of the contacts, counter means advanced by closely consecutive separations of the contacts to effect interruption of the closing circuit after a predetermined number of such interruptions, and trip means operable to effect release of the releasable means and advance of the counter means to effect interruption of the closing circuit regardless of the number of separations.

10. In a circuit interrupter, separable contacts, an operating mechanism for said contacts including means biasing the mechanism to separate said contacts, closing means operable to actuate said mechanism to close said contacts, releasable means maintaining the mechanism in a position wherein the contacts are closed, current responsive means operated by a current above a predetermined value to effect release of the releasable means, counter means cumulatively advanceable by closely successive operations of the operating mechanism, switch means connected in circuit with the closing means actuated by the counter means connected to prevent operation of the closing means after a predetermined number of operations of the operating mechanism, and trip means operable to effect release of the releasable means and open the circuit of the closing means.

11. A circuit interrupter comprising, a plurality of pairs of separable contacts, operating means connecting said contacts for simultaneous separation, solenoid means connected in series with each pair of said contacts and having a movable part connected to actuate said operating means, a delay means individual to each movable part to delay operation thereof, a counter means responsive to successive operations of the operating means, and means actuated by the counter means to vary the effectiveness of the delay means.

12. A circuit interrupter comprising, a plurality of pairs of separable contacts, an operating mechanism connecting said contacts for simultaneous separation, biasing means biasing said mechanism to effect separation of the contacts, releasable means preventing movement of said mechanism to separate said contacts, solenoid means connected in series with each pair of said contacts and having a movable part connected to actuate the releasable means, a delay means connected to each movable part to delay operation thereof, a counter means actuated by closely successive contact separations, and means actuated by the counter means to vary the effectiveness of the delay means.

13. A circuit interrupter comprising, a plurality of pairs of separable contacts, operating means connecting said contacts for simultaneous separation, a plurality of solenoid means each connected in series with a pair of said contacts and having a movable part connected to actuate said operating means, a plurality of delay means each connected to a movable part to delay movement thereof and having means for varying the delay time, control means connecting said delay time varying means for simultaneous actuation, and a counter means actuating said control means in response to a predetermined number of successive operations of said operating means.

References Cited in the file of this patent

UNITED STATES PATENTS

| | | |
|---|---|---|
| 1,554,718 | Dryer | Sept. 22, 1925 |
| 1,670,088 | Walle | May 15, 1928 |
| 2,445,442 | Leeds et al. | July 20, 1948 |
| 2,463,029 | Fry | Mar. 1, 1949 |
| 2,561,452 | Van Ryan et al. | July 24, 1951 |
| 2,753,424 | Peek | July 3, 1956 |